United States Patent
Harada et al.

[11] Patent Number: 5,911,926
[45] Date of Patent: Jun. 15, 1999

[54] POROUS MATERIAL OF POLYTETRAFLUOROETHYLENE AND PRODUCTION PROCESS THEREOF

[75] Inventors: Akira Harada; Atsushi Uno; Shousuke Yamanouchi; Akira Nishimura, all of Osaka, Japan

[73] Assignee: Sumitomo Electric Industries, Ltd., Osaka, Japan

[21] Appl. No.: 08/362,562

[22] PCT Filed: May 2, 1994

[86] PCT No.: PCT/JP94/00735

§ 371 Date: Jan. 3, 1995

§ 102(e) Date: Jan. 3, 1995

[30] Foreign Application Priority Data

May 1, 1993 [JP] Japan ................................ 5-128018
Mar. 29, 1994 [JP] Japan ................................ 6-082496

[51] Int. Cl.$^6$ ............................................ B27J 5/00
[52] U.S. Cl. .................... 264/41; 264/119; 264/127; 264/288.8; 264/340; 264/345; 264/DIG. 68; 264/DIG. 73
[58] Field of Search .................. 428/315.5, 315.7, 428/288, 304.4; 264/41, 119, 127, 288.8, 340, 345, DIG. 68, DIG. 73

[56] References Cited

U.S. PATENT DOCUMENTS 5,234,751  8/1993  Harada et al. .................... 428/315.7

FOREIGN PATENT DOCUMENTS 64-78823  3/1989  Japan .

Primary Examiner—Marion E. McCamish
Assistant Examiner—Elizabeth M. Cole
Attorney, Agent, or Firm—McDermott, Will & Emery

[57] ABSTRACT

A porous material of a polytetrafluoroethylene (PTFE), which can retain at least 90% of 0.109 μm latex spheres and has a flow rate (IPA flow rate) of at least 0.6 ml/cm$^2$/min as measured with isopropyl alcohol under a differential pressure of 1 kg/cm$^2$. A process for the production of a porous material of PTFE, which comprises, after forming a molded article from fine powder of PTFE by paste extrusion, (1) sintering the molded article, (2) rolling up the molded article thus sintered and heat-treating it at a temperature lower than the melting point of the polytetrafluoroethylene in a state as rolled up, and then (3) stretching the molded article thus heat-treated in at least an uniaxial direction. The porous material of PTFE according to the present invention has micropores and good permeability and particularly is excellent in performance of retaining fine particles.

4 Claims, 2 Drawing Sheets

POROUS MATERIAL OF POLYTETRAFLUOROETHYLENE AND PRODUCTION PROCESS THEREOF

This application is a 371 application of PCT/JP94/00735 filed May 2, 1994.

TECHNICAL FIELD

The present invention relates to a porous material of a polytetrafluoroethylene and a production process thereof, and more particularly to a porous material of a polytetrafluoroethylene, which has micropores, and is high in porosity and excellent in permeability, and a production process thereof.

BACKGROUND ART

Porous materials comprising a polytetrafluoroethylene (hereinafter abbreviated as "PTFE") as a material are used in a wide variety of fields such as separator for cells, membrane filters, electric wires, analytical instruments and artificial blood vessels. Now, in recent years, porous materials of PTFE having a minute pore diameter and excellent permeability have been required of application fields such as precision filters, high-performance separation membranes and artificial lung septa. Therefore, porous materials of PTFE having micropores and a high porosity have been required. However, it has been very difficult to produce a porous material of PTFE, which combines micropores with a high porosity and has excellent permeability.

As a process for producing a porous material of PTFE, it has heretofore been known to stretch an unsintered molded article obtained by paste extrusion of PTFE at a temperature not higher than the melting point of PTFE and then sinter the molded article (Japanese Patent Publication No. 13560/1967). According to this process of stretching the unsintered molded article, porous material of PTFE having various porosities can be obtained. However, the pore diameter becomes greater as the draw ratio is increased to enhance the porosity. Therefore, there has been a limit in the production of porous material of PTFE combining micropores and a high porosity.

As another process for producing a porous material of PTFE, it has also been proposed to heat a molded article of PTFE to a temperature not lower than 327° C., slowly cool the sintered molded article so as to heat-treat it to give a crystallinity of 80%, and then uniaxially stretch the sintered molded article at a draw ratio of 1.5–4 times at a temperature of 25–260° C. (Japanese Patent Publication No. 42794/1978). According to this process (hereinafter abbreviated as "the slow cooling process"), a porous material of PTFE in which micropores have been formed can be obtained. In the slow cooling process, however, crystallization is not allowed to fully progress if the cooling rate is too fast in the step of slowly cooling the sintered molded article of PTFE. It is thus necessary to decelerate the cooling rate. Accordingly, this process has involved a problem that precise temperature control and large equipment are required.

More specifically, it is said in the slow cooling process that it is preferable to cool the sintered molded article generally at a rate slower than about 0.5° C./min for enhancing the crystallinity of the resulting sintered molded article of PTFE. In Examples of this publication, cooling rates of 0.25° C./min, 0.1° C./min and 0.05° C./min are used. In order to perform slow cooling at such a low cooling rate, it is necessary to conduct temperature control with extremely high precision. In addition, porous materials of PTFE are generally formed as continuous molded articles such as rods, tubes, strips and sheets by paste extrusion of fine powder of PTFE. The PTFE porous material is formed through a heat-treating step, a stretching step and the like. It is however difficult and impracticable to apply the slow cooling process to these continuous sintered molded articles. For example, in order to cool a sintered molded article in the form of a continuous sheet from 350° C. to 290° C. at a cooling rate of 0.5° C./min by means of an oven 3 m long, it is necessary to pass the sheet through the oven over 2 hours. The transit time in the oven is 1.5 m/hr in terms of linear velocity. Therefore, in the case where the length of the continuous sheet is 100 m, it takes about 67 hours to pass through the oven. On the other hand, in order to slowly cool a continuous sheet 100 m long in 20 hours under the above-described cooling conditions, it is necessary to pass the sheet through the oven at a linear velocity of 5 m/hr. Therefore, a large oven as long as 10 m is required.

As described above, in the process in which the sintered molded article is slowly cooled from the temperature not lower than the melting point of PTFE, the production of a continuous sintered molded article requires either a very long oven or a treatment at a very low linear velocity. Therefore, there is a limit in industrial practice.

Japanese Patent Application Laid-Open No. 78823/1989 discloses a production process of a porous PTFE membrane, in which fine powder of a PTFE having a number average molecular weight of 1,000,000 or lower is paste-extruded into a molded article, the molded article is sintered, the sintered molded article is slowly cooled from the sintering temperature at a rate lower than 10° C./hr (1° C./hr in Example 1) to enhance its crystallinity, and the thus-cooled sintered molded article is then stretched in at least an uniaxial direction. One of the co-inventors of the present invention proposed a process in which a continuous molded article of PTFE is sintered, and the resultant sintered molded article is slowly cooled while passing the sintered molded article through at least two different zones, which are successively preset from a higher-temperature region to a lower-temperature region in a temperature range of 350–290° C. and are controlled at substantially fixed temperatures, thereby enhancing its crystallinity, and previously applied for a patent (Japanese patent Application Laid-Open No. 8344/1994). When the molded articles enhanced in crystallinity according to these processes are stretched, porous PTFE membranes having micropores and a high porosity can be obtained. However, the molded articles enhanced in crystallinity according to these processes tend to break if they are stretched at a draw ratio of 10 times or higher. As a result, the porosities of the resulting porous PTFE membranes have been at most 65% or so. The reason for it is considered to be attributable to the fact that in these processes for enhancing crystallinity, the molded article is held for a considerably long period of time at a temperature not lower than the melting point of PTFE, and so microstructural thermal decomposition occurs, thereby reducing elongation percentage.

A PTFE filter is excellent in heat resistance and chemical resistance and hence used mainly in filtration of chemicals and gases in a field of semiconductors. With the high integration of semiconductors in the field of semiconductors, there is a strong demand for development of a PTFE filter having a minuter pore diameter. Since the yield of high-integrated semiconductors is affected by the retention of a PTFE filter, there is a demand for development of a filter high in the retention of fine particles. Namely, judging from the recent performance requirement for PTFE filters, it is desirable that the 0.109 μm latex retention be at least 90%, preferably at least 99%, more preferably 100%. In commercially-available PTFE filters (pore diameter: 0.1 μm and 0.05 μm), however, the 0.109 μm latex retention is up to a maximum of about 70%. On the other hand, it has been known a porous PTFE membrane having a pore diameter of 0.02 μm. However, its flow rate (IPA flow rate) as determined with isopropyl alcohol is as extremely low as 0.0005 ml/cm$^2$/min (as measured under a differential pressure of 0.95 kg/cm$^2$), and so the filter is lacking in practical performance.

DISCLOSURE OF THE INVENTION

It is an object of the present invention to provide a porous material of a polytetrafluoroethylene, which combines micropores with a high porosity and has excellent permeability, and a production process thereof.

The present inventors have carried out an extensive investigation with a view toward developing a process for producing a porous material of PTFE having micropores and a high porosity with ease even if it is a continuous molded article such as a continuous sheet. As a result, it has been found that such an object can be achieved by sintering a molded article obtained by paste extrusion of PTFE fine powder, rolling up the molded article, heat-treating the molded article at a temperature lower than the melting point of PTFE in a state as rolled up, and then stretching the molded article thus heat-treated in at least an uniaxial direction.

In the conventional slow cooling process, its application to a continuous molded article requires an elaborate equipment for conducting precise temperature control and control of cooling rate. According to the process of the present invention, however, a porous material of PTFE having micropores and a high porosity can be obtained by applying a very simple heat-treating process, in which the sintered molded article is rolled up around a roll or the like and then held for a certain period of time at a temperature lower than the melting point of PTFE.

According to the process of the present invention, the crystallization of the molded article is advanced by a substantially isothermal heat treatment at a temperature lower than the melting point of PTFE. Therefore, elongation percentage is also enhanced, and so the molded article can be stretched up to about 30 times, and the porosity of the porous material of PTFE can be increased from a maximum of about 65% in the conventional porous materials of PTFE to a maximum of about 90%.

In addition, the porous material of PTFE according to the present invention can retain at least 90% of 0.109 μm latex spheres, preferably at least 99%, more preferably 100%. Besides, the porous material of PTFE according to the present invention has an IPA flow rate of at least 0.6 ml/cm$^2$/min and is hence excellent in practical performance as a filter.

The present invention has been led to completion on the basis of these findings.

According to the present invention, there is thus provided a porous material of a polytetrafluoroethylene, which can retain at least 90% of 0.109 μm latex spheres and has a flow rate (IPA flow rate) of at least 0.6 ml/cm$^2$/min as measured with isopropyl alcohol under a differential pressure of 1 kg/cm$^2$, wherein the retension rate is determined in the following manner:

A disk 47 mm across is punched out of a sample membrane and set in a holder. Then, 32 cm$^3$ of an aqueous solution containing uniform particles of a polystyrene latex sphere having a particle diameter of 0.109 μm in a concentration of 1.4×10$^{10}$ particles/cm$^3$ is filtered through the disk under a pressure of 0.42 kg/cm$^2$. At this time, the retention of the particles is determined by means of a spectrophotometer for ultraviolet and visible region at a wavelength of 310 nm.

According to the present invention, there is also provided a process for the production of a porous material of a polytetrafluoroethylene, which comprises, after forming a molded article from fine powder of the polytetrafluoroethylene by paste extrusion, (1) sintering the molded article, (2) rolling up the molded article thus sintered and heat-treating it at a temperature lower than the melting point of the polytetrafluoroethylene in a state as rolled up, and then (3) stretching the molded article thus heat-treated in at least an uniaxial direction.

BEST MODE FOR CARRYING OUT THE INVENTION

Fine Powder of Polytetrafluoroethylene

Figure 1:
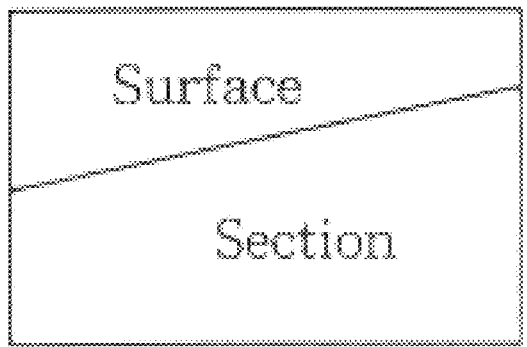
FIG. 1 is a scanning microphotograph (5,000 magnifications) showing a fine fibrous structure of a porous PTFE sheet according to the present invention, which was obtained in Example 3. A drawing under the photograph indicates that the upper left part of the photograph is a surface, and the lower part thereof is a section.
Figure 1:
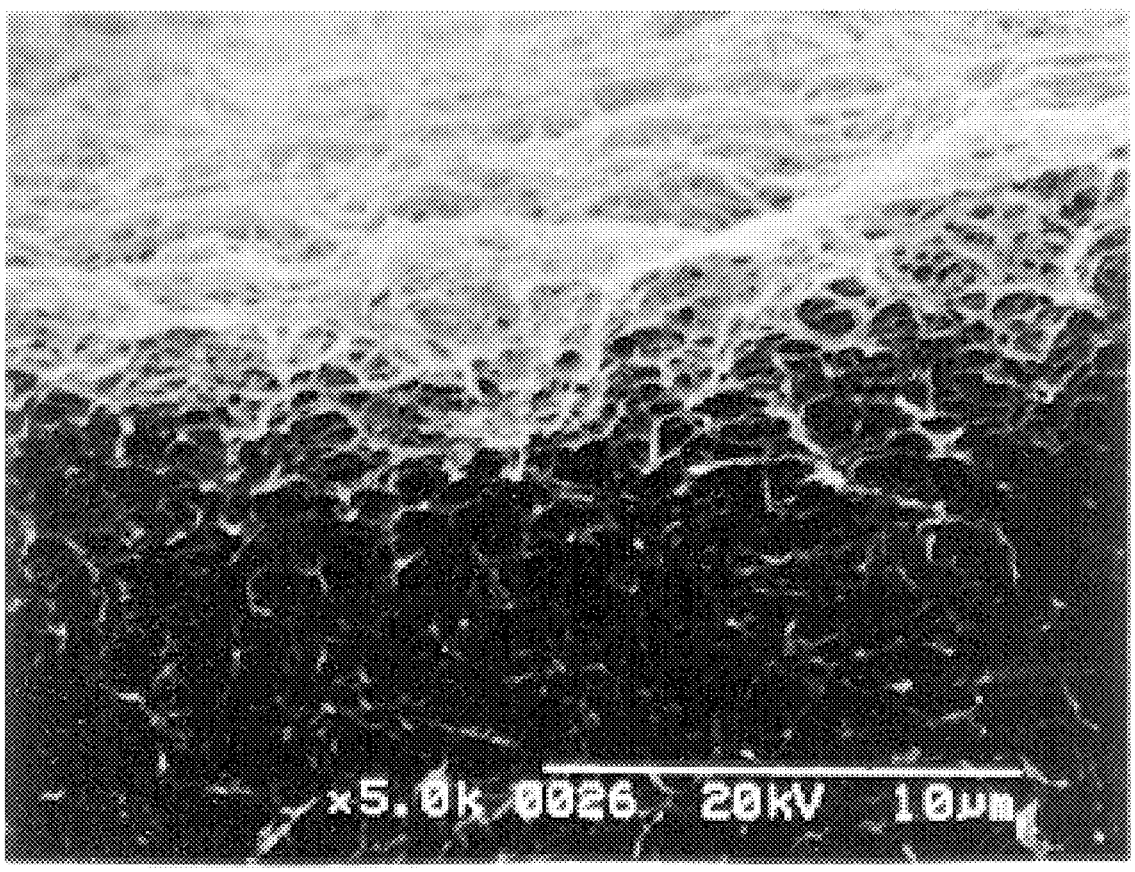

PTFE used in the present invention is in the form of fine powder. The number average molecular weight of PTFE ranges from hundreds of thousands to tens of millions, and no particular limitation is imposed on the molecular weight. It is however preferable to use a PTFE having a relatively low molecular weight for applying the production process of the present invention thereto. The reason for it is that the heat-treating time required of a PTFE having a lower molecular weight can be shortened compared with a PTFE having a higher molecular weight, and so a porous material of PTFE having micropores and a high porosity can be obtained in a relatively short period of time. As the PTFE having a low molecular weight, those having a molecular weight not higher than 2,000,000 are preferred. A particularly preferred range of the molecular weight is from 200,000 to 2,000,000.

Paste Extrusion

The first step of producing the porous material of PTFE according to the process of the present invention is formation of a molded article by a paste extrusion process heretofore known as a production process for an unsintered sheet or the like. In the step of the paste extrusion, a liquid lubricant is incorporated in PTFE in a proportion of 15–40 parts by weight, preferably 20–30 parts by weight per 100 parts by weight of PTFE to conduct extrusion.

As the liquid lubricant, may be used various lubricants heretofore used in the paste extrusion process. Specific examples thereof include petroleum solvents, hydrocarbon oils such as solvent naphtha and white oil, aromatic hydrocarbons such as toluol and xylol, alcohols, ketones, esters, silicone oil, fluorocarbon oil, solutions obtained by dissolving a polymer such as polyisobutylene or polyisoprene in these solvents, mixtures of two or more these lubricants, and water or aqueous solution containing a surfactant.

The formation by the paste extrusion is performed at a temperature lower than the melting temperature (327° C.) of PTFE, generally, a temperature near room temperature. Preforming is generally conducted prior to the paste extrusion. In general, a mixture of PTFE and the liquid lubricant is preformed under a pressure of, for example, 1–50 kg/cm$^2$ or so, and the preformed article is then extruded through a paste extruder or rolled by calender rolls or the like, or extruded and then rolled into a molded article in the desired shape.

Examples of the shape of the molded article obtained by the paste extrusion include various shapes such as a rod, tube, strip and sheet. A thinner sheet can also be obtained by further rolling the sheet thus formed. The molded article according to the present invention may have any shape so far as it can be subjected to stretching after its sintering.

The liquid lubricant is removed from the molded article obtained by the paste extrusion by heating, extraction or dissolution prior to the sintering of the molded article. The heating temperature in this case is generally 100–300° C. However, the removal by extraction may preferably be adopted if a liquid lubricant having a relatively high boiling point, such as silicone oil or a fluorocarbon, is used.

By the way, other substances in addition to the liquid lubricant may be incorporated as necessary for the intended application. For example, as pigments for coloring, and for the purpose of improvement of abrasion resistance, prevention of cold flow and easy formation of pores, carbon black, graphite, silica powder, asbestos powder, glass powder, glass fibers, inorganic fillers such as silicates and carbonates, metal powders, metal oxide powders, metal sulfide powders may be added to the mixture. In order to facilitate the formation of a porous structure, substances capable of being removed or decomposed by heating, extraction or dissolution, for example, ammonium chloride, sodium chloride, other plastics, rubbers and the like may also be incorporated in the form of powder or a solution.

Sintering

The molded article obtained by the paste extrusion is then sintered. The sintering is conducted by heating it at a temperature not lower than the transition point (327° C.) of PTFE for several minutes to several tens minutes, or a longer period of time if circumstances require. The sintering is generally performed by passing the molded article through a heating oven controlled at 350–500° C.

Heat Treatment

In the present invention, the sintered molded article of PTFE is rolled up around a roll or the like after the sintering and then subjected to a heat treatment in a state as rolled up, namely, in a constrained state. The heat treatment is conducted at a temperature lower than the transition point (melting point) of PTFE under conditions that the continuous sintered molded article rolled up, such as a sheet, is not fusion-bonded itself.

The heat-treating temperature is preferably within a range of 280–325° C., more preferably 300–320° C. The heat treatment can be carried out by holding the sintered molded article of PTFE as rolled up in an oven kept at a predetermined temperature. The retention time in the oven is generally 1–50 hours, preferably 5–30 hours.

By conducting this heat treatment, the molecule of PTFE is orientated, and so the crystallinity of PTFE is increased. It is preferable to increase the crystallinity of the sintered molded article to at least 80% from the viewpoint of the formation of micropores and the enhancement of porosity. In order to obtain a porous material of PTFE having micropores and a high porosity, it is preferable to conduct the heat treatment over 5 hours or longer in the above-described temperature range. However, it is preferable from the viewpoint of efficiency to determine the upper limit of the heat-treating time within preferably 50 hours, more preferably 30 hours.

In the heat-treating step according to the present invention, the heat treatment of the sintered molded article of PTFE is performed in a state as rolled up at a temperature lower than the melting point of PTFE. Therefore, a number of sintered molded articles can be heat-treated at the same time in an oven. A porous material having a higher porosity is provided by stretching the sintered molded article in a subsequent stretching step as the crystallinity of the sintered molded article crystallized increases. The stretchability of the sintered molded article itself is also more improved as the crystallinity increases.

The production process of the present invention has the greatest feature in that the heat-treating step for enhancing the crystallinity is performed after the non-sintered molded article is sintered and then rolled up. The sintered molded article of PTFE can be rolled up, and the fusion bonding of the rolled article itself can be prevented so far as it is heat-treated at a temperature lower than the melting point of PTFE. The heat treatment can be conducted by holding the sintered molded article in a state as rolled up in an oven controlled at a predetermined temperature without need of conducting slow cooling like the conventional processes.

According to the production process of the present invention, the heat treatment for enhancing the crystallinity of the sintered molded article is performed at a temperature lower than the melting point of PTFE under substantially isothermal conditions. Therefore, microstructural thermal decomposition can be avoided. Accordingly, since the sintered molded article subjected to the heat treatment advances in crystallization and its elongation percentage increases, it is not broken even when it is stretched at a draw ratio as high as 30 times or so.

After the heat treatment, the sintered molded article can be unwound to feed to a subsequent stretching step. According to the process of the present invention, therefore, a crystallization treatment of a continuous sintered molded article such as a continuous sheet, which has heretofore been difficult to carry out, can be performed with ease.

Stretching

The sintered molded article obtained by the crystallization treatment and having high crystallinity is then stretched in at least an uniaxial direction. The stretching can be performed by mechanically stretching an article in the form of a sheet, rod, tube or the like by a method known per se in the art. For example, in the case of a sheet, it can be stretched by holding its two sides opposite to each other and stretching it so as to widen its space, or by making a take-up rate higher than a feed rate upon rolling up the sheet from one core to the other core. In the case of a rod or tube, it is simple to stretch it in its lengthwise direction. Biaxial stretching may also be conducted successively or simultaneously.

The stretching is performed at a temperature lower than the melting point of PTFE, generally, 0–260° C. The stretching at a lower temperature tends to form a porous material relatively great in pore diameter and high in porosity. The stretching at a higher temperature tends to form a close porous material relatively small in pore diameter. The porosity of the porous material increases as the draw ratio is higher. Therefore, a porous material having the desired physical properties can be obtained by suitably combining these conditions with each other.

In the stretching step, the porosity of the resulting porous material of PTFE increases as the draw ratio is made higher. In order to obtain a porous material high in porosity and excellent in permeability, therefore, it is desirable to perform the stretching at a draw ratio of at least 5 times (area ratio), preferably 6–30 times or so, more preferably 9–30 times or so. In the case where biaxial stretching is conducted, it is preferable to stretch the article in one direction at a draw ratio of 2 times to 8 times or so and control a ratio of the stretching in a longitudinal direction to the stretching in a transverse direction within a range of from 1:5 to 5:1. It is also permissible to conduct the first-stage stretching at a low temperature of 20° C. or so and then perform the second-stage stretching under higher-temperature conditions.

The porous material of PTFE obtained by the stretching tends to shrink when it is heated to 327° C., which is a melting point of PTFE, or higher. In addition, when the porous material thus stretched is left to stand without setting, it shrinks to lose its porous structure or to cause irregularities of the porous structure. Therefore, it is preferable to conduct heat setting after the stretching. The heat setting is conducted by holding the stretched article at a temperature of 150–250° C. or so for 1–30 minutes or so while keeping the stretched state under tension by the fixation of both ends, or the like.

Porous Material of Polytetrafluoroethylene

The porous material of PTFE according to the present invention can have any shape, for example, a shape of a sheet or tube, according to the form of the molded article obtained by the paste extrusion, and has a feature in that it combines micropores with a high porosity. Specifically, the porous material of PTFE according to the present invention has the following properties:

(1) The pore diameter of the porous material of PTFE varies according to the crystallinity, draw ratio and the like of the sintered article of PTFE.

(2) According to the present invention, since the draw ratio can be made higher than that of the conventional process, the porous material can be made microporous, and its porosity (as determined in accordance with ASTM-D-792) can be made as high as 60–90% or so, preferably 70–90% or so, more preferably 80–90% or so.

(3) With respect to the thickness of the porous material of PTFE, porous materials having various thicknesses can be produced by changing the draw ratio or the like. Thin membranes having a thickness of 50 µm or thinner, moreover 10 µm or so can be obtained with ease by increasing the draw ratio.

(4) The bubble point (as determined with isopropyl alcohol in accordance with ASTM-F-316-76) of the porous material of PTFE according to the present invention is generally 2–8 kg/cm$^2$ or so.

(5) The IPA flow rate (as determined with isopropyl alcohol under a differential pressure of 1 kg/cm$^2$) of the porous material of PTFE according to the present invention is generally at least 0.6 ml/cm$^2$/min.

(6) The porous material of PTFE according to the present invention is far excellent in retention performance. In the case of a filtration membrane, it can retain at least 90% of 0.109 µm latex spheres, preferably at least 99%, more preferably 100%.

On the other hand, commercially-available porous PTFE membranes separately having pore diameters of 0.1 µm and 0.05 µm have retention of particles having a particle diameter of 0.109 µm of about 10% and about 70%, respectively. A porous PTFE membrane having a pore diameter of 0.02 µm is also commercially available. However, its IPA flow rate is as extremely low as 0.0005 ml/cm$^2$/min (under a differential pressure of 0.95 kg/cm$^2$), and so the retention of the particles cannot be determined. Besides, the porous material of PTFE according to the present invention can retain at least 30% of 0.073 µm latex spheres, preferably at least 50%, more preferably at least 60%.

(7) The porous material of PTFE according to the present invention also has a feature in a microstructure. FIG. 1 is a photograph (5,000 magnifications), taken by a scanning electron microscope (SEM), of a porous PTFE sheet obtained in Example 3 according to the present invention. The upper left part of the photograph is a surface, and the lower part thereof is a section. According to the production process of the present invention, the molded article of PTFE produced by the paste extrusion of fine powder of PTFE is first sintered. At this time, the PTFE resin melts. When the sintered molded article is then rolled up and then heat-treated at a temperature lower than the melting point of PTFE, the sintered molded article subjected to the heat treatment advances in crystallization. It is considered that the resin melted upon this crystallization is reorganized, particularly, in a thickness direction. When the sintered molded article to which high crystallinity has been imparted in this manner is stretched at a high draw ratio, a structure in which a fine fibrous structure is three-dimensionally networked is formed. The sizes of pores formed in the surface and the section of the porous PTFE sheet are substantially the same.

Figure 2:
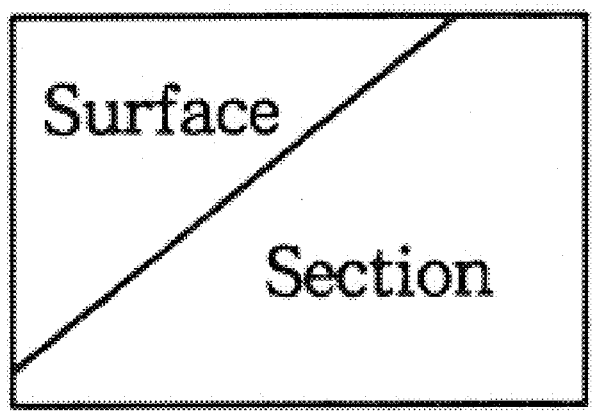
FIG. 2 is a scanning microphotograph (5,000 magnifications) showing a fine fibrous structure of a porous PTFE sheet according to the prior art, which was obtained in Comparative Example 3. A drawing under the photograph indicates that the upper left part of the photograph is a surface, and the lower part thereof is a section.
Figure 2:
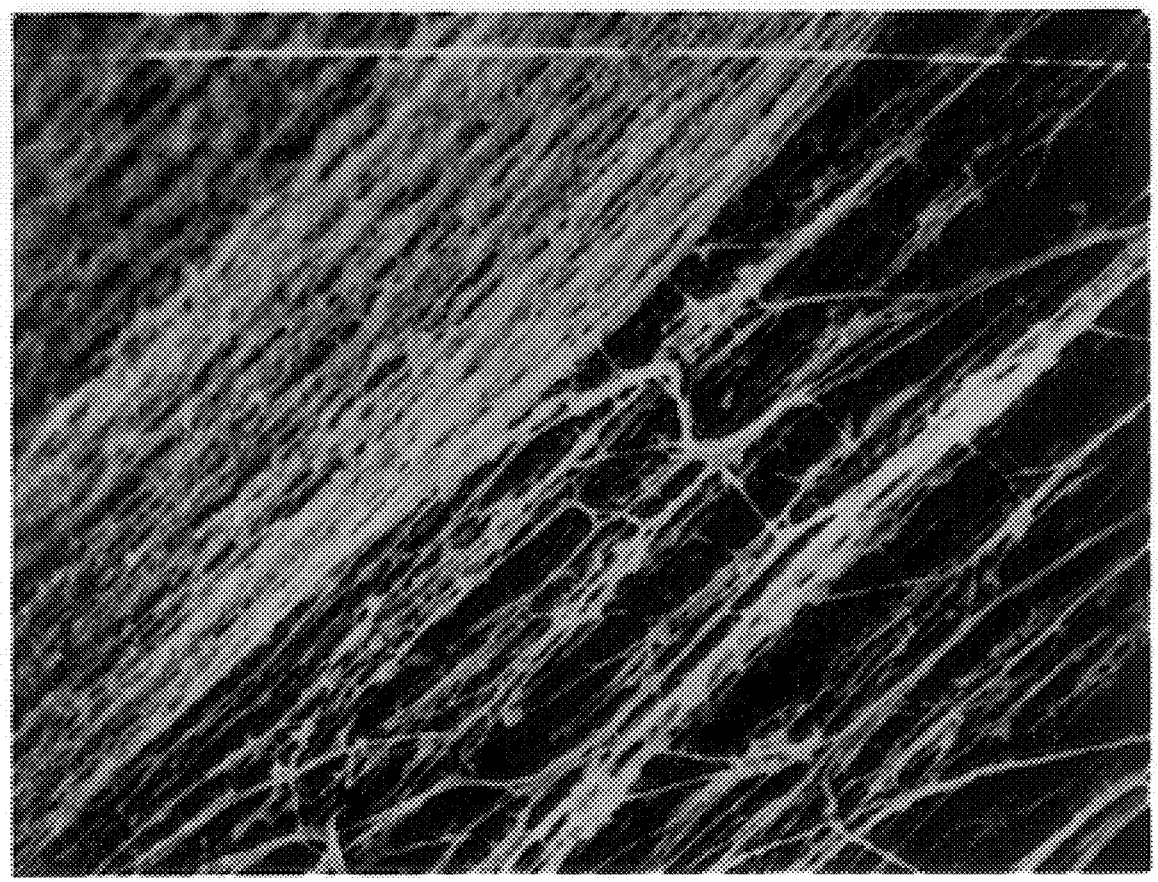

On the other hand, a porous PTFE sheet according to Comparative Example 3, obtained in accordance with the conventional process in which an unsintered molded article obtained by the paste extrusion of PTFE is stretched at a temperature not higher than the melting point of PTFE and then heat-treated (for example, Japanese Patent Publication No. 13560/1967), is close only in the surface thereof (the same may be said of the back side) and coarse in the interior thereof and forms layers as illustrated by an SEM photograph (5,000 magnifications) in FIG. 2.

By such a structural difference, the porous PTFE sheets in FIGS. 1 and 2 have a marked difference in the retention of a particle diameter of 0.109 µm though their bubble points are 3.8 kg/cm$^2$ and the same. The particles can be retained by 100% by the invention product (Example 3), but only by 55% by the comparative product (Comparative Example 3).

By the way, the porous PTFE membranes obtained by stretching articles of the crystallinity of which has been enhanced by processes described in Japanese Patent Application Laid-Open No. 78823/1989 and Japanese Patent Application No. 188613/1992 cannot have such a three-dimensional network structure as illustrated in FIG. 1 because they cannot be stretched at a high draw ratio.

The porous material of PTFE according to the present invention combines micropores with a high porosity and moreover has a smooth surface high in evenness, high mechanical strength, non-adhesiveness, low frictional properties and good flexibility. The porous material permits the permeation of gases, liquids, fine particles and the like. The porous material of PTFE according to the present invention has a wide variety of applications such as filter media, membranes or septa, lubricating materials, and non-adhesive materials. In particular, it can be used as a filter for chemicals, a separation membrane for plasma components, a septum for an artificial lung or the like in fields of semiconductors, medical care, biological industries and the like by making good use of the feature that it combines micropores with a high porosity.

EXAMPLES

The present invention will hereinafter be described in detail by the following examples and comparative examples. However, the present invention is not limited to these examples only.

Incidentally, the measuring methods of physical properties in the following examples and comparative examples are as follows:

IPA Bubble Point (kg/cm$^2$)

Measurement was conducted with isopropyl alcohol in accordance with ASTM-F-316-76.

Porosity (%)

Measurement was conducted in accordance with ASTM-D792.

IPA Flow Rate (ml/cm$^2$/min)

Measurement was conducted with isopropyl alcohol under a differential pressure of 1 kg/cm$^2$.

Retention (%)

A disk 47 mm across was punched out of a sample membrane and set in a holder. On the other hand, an aqueous solution containing uniform particles of a polystyrene latex sphere (product of Dow Chemical Co.) having a particle diameter of 0.109 μm in a concentration of $1.4 \times 10^{10}$ particles/cm$^3$ was prepared. The aqueous solution in an amount of 32 cm$^3$ was filtered through the sample membrane set in the holder under a pressure of 0.42 kg/cm$^2$, thereby determining a retention of the particles. The retention of the particles was measured by means of a spectrophotometer for ultraviolet and visible region, UV-160 manufactured by Shimadzu Corporation at a wavelength of 310 nm to evaluate it. Accuracy in measurement was 1/100.

Another retention of particles was also measured in the same manner as described above except that uniform particles of a polystyrene latex sphere having a particle diameter of 0.073 μm was used.

Example 1

A blend obtained by blending 100 parts by weight of fine powder of a polytetrafluoroethylene (CD-4, product of Asahi Glass Co., Ltd.; molecular weight: 500,000) with 18 parts by weight of Drysol as a lubricant was preformed and then extruded into a sheet. This extrudate was further rolled and then passed through heating rolls to remove the lubricant therefrom, thereby forming a sheet having a thickness of 0.3 mm.

This sheet was continuously passed through an heating oven controlled at 350–500° C. to sinter it. The sheet thus sintered was then rolled up by about 60 m around a roll (diameter: 30 cm). The rolled sheet was held for 20 hours in an oven controlled at 315° C. and then rewound. The sheet was then stretched by 200% in an extrusion direction at a roll temperature of 150° C., and then stretched by 700% in a direction perpendicular to the extrusion direction at an oven temperature of 70° C.

The crystallinity of the PTFE sheet subjected to the heat treatment for 20 hours at 315° C. increased to 87%. The crystallinity was determined from the general relationship between the crystallinity and specific gravity of PTFE. The properties of the porous PTFE sheet thus obtained are shown in Table 1.

Example 2

A heat-treated sheet was obtained in the same manner as in Example 1 except that the heat-treating conditions for the sintered sheet were changed to 315° C. and 10 hours, and a sheet having a crystallinity of 83% was provided. The heat-treated sheet was then stretched by 200% in an extrusion direction at a roll temperature of 150° C., and then stretched by 550% in a direction perpendicular to the extrusion direction at an oven temperature of 70° C. The properties of the porous PTFE sheet thus obtained are shown in Table 1.

Example 3

A heat-treated sheet was obtained in the same manner as in Example 1 except that the heat-treating conditions for the sintered sheet were changed to 320° C. and 20 hours, and a sheet having a crystallinity of 90% was provided. The heat-treated sheet was then stretched by 200% in an extrusion direction at a roll temperature of 150° C., and then stretched by 550% in a direction perpendicular to the extrusion direction at an oven temperature of 70° C. The properties of the porous PTFE sheet thus obtained are shown in Table 1. Besides, a scanning microphotograph of this porous PTFE sheet is illustrated in FIG. 1.

Example 4

A heat-treated sheet was obtained in the same manner as in Example 1 except that the heat-treating conditions for the sintered sheet were changed to 310° C. and 10 hours, and a sheet having a crystallinity of 80% was provided. The heat-treated sheet was then stretched by 100% in an extrusion direction at a roll temperature of 150° C., and then stretched by 400% in a direction perpendicular to the extrusion direction at an oven temperature of 70° C. The properties of the porous PTFE sheet thus obtained are shown in Table 1.

Example 5

A porous PTFE sheet was produced in the same manner as in Example 1 except that fine powder of another polytetrafluoroethylene (CD-1, product of Asahi Glass Co., Ltd.; molecular weight: 1,000,000–2,000,000) was used. The properties of the porous PTFE sheet thus obtained are shown in Table 1.

Example 6

A porous PTFE sheet was produced in the same manner as in Example 1 except that fine powder of another polytetrafluoroethylene (CD-1, product of Asahi Glass Co., Ltd.; molecular weight: 1,000,000–2,000,000) was used, and the amount of Drysol was changed to 22 parts by weight. The properties of the porous PTFE sheet thus obtained are shown in Table 1.

Comparative Example 1

A sintered sheet (crystallinity: 76%) was formed in the same manner as in Example 1, stretched by 200% in an extrusion direction at a roll temperature of 150° C. without conducting any heat treatment, and then stretched in a direction perpendicular to the extrusion direction. However, the stretching in the perpendicular direction was unable to be performed only by 300% or lower. The properties of the porous sheet obtained at that time were as shown in Table 1.

Comparative Example 2

A dry sheet having a thickness of 0.3 mm was obtained by the paste extrusion of the fine powder of the polytetrafluoroethylene in the same manner as in Example 1. This sheet was heated to 350° C. to sinter it, and then cooled to 300° C. at a cooling rate of 1° C./hr. Thereafter, the thus-cooled sheet was cooled to room temperature in an air atmosphere (25° C.). The sintered sheet thus obtained was stretched by 200% in a lengthwise direction and by 400% in a crosswise direction at 150° C. The properties of the porous PTFE sheet thus obtained are shown in Table 1.

Comparative Example 3

A blend obtained by blending 100 parts by weight of fine powder of a polytetrafluoroethylene (CD-123, product of Asahi Glass Co., Ltd.; molecular weight: 10,000,000) with 18 parts by weight of Drysol as a lubricant was preformed and then extruded into a sheet. This extrudate was further rolled and then passed through heating rolls to remove the lubricant therefrom, thereby forming a sheet having a thickness of 0.3 mm. This sheet was stretched by 200% in a lengthwise direction and by 700% in a crosswise direction at a temperature of 150° C. After the stretching, the stretched sheet was heat-treated at 300° C. The properties of the porous PTFE sheet thus obtained are shown in Table 1. Besides, a scanning microphotograph of this porous PTFE sheet is illustrated in FIG. 2.

TABLE 1

|  | Example | | | | | | Comp. Ex. | | |
|---|---|---|---|---|---|---|---|---|---|
|  | 1 | 2 | 3 | 4 | 5 | 6 | 1 | 2 | 3 |
| Porosity (%) | 81.5 | 85.0 | 87.2 | 60.3 | 60.5 | 67.2 | 51.4 | 60.5 | 88.0 |
| IPA bubble point (kg/cm$^2$) | 5.8 | 6.0 | 3.8 | 5.6 | 6.1 | 5.2 | 6.2 | 5.5 | 3.8 |
| IPA flow rate (ml/cm$^2$/min) | 1.8 | 1.2 | 4.1 | 0.7 | 0.6 | 0.7 | 0.68 | 0.71 | 3.8 |
| Retention: | | | | | | | | | |
| 0.109 μm | 100 | 100 | 100 | 100 | 100 | 100 | 81 | 70 | 55 |
| 0.073 μm | 50 | 60 | 30 | 70 | 85 | 75 | — | — | — |

INDUSTRIAL APPLICABILITY

According to the present invention, a porous material of PTFE far excellent in retention performance can be provided. According to the production process of the present invention, a porous material of a polytetrafluoroethylene, which has micropores and a high porosity and possesses excellent permeability, can be provided. This porous material of the polytetrafluoroethylene can be used as a separation membrane, a septum for an artificial lung or the like in a wide variety of fields of semiconductors, medical care, biological industries and the like.

We claim:

1. A process for the production of a porous material of a polytetrafluoroethylene, which comprises, after forming an article from fine powder of the polytetrafluoroethylene by paste extrusion, (1) sintering the molded article, (2) rolling up the molded sintered article and heat-treating it at a temperature lower than a melting point of the polytetrafluoroethylene in a state as rolled up, wherein the heat treatment is performed at a temperature of 280–325° C. for 1–50 hours under substantially isothermal conditions and then (3) stretching the molded heat-treated article in at least an uniaxial direction wherein the stretching is performed at a draw ratio of at least 9 times.

2. A production process according to claim 1, wherein an article in the form of a sheet is formed by the paste extrusion of the fine powder of the polytetrafluoroethylene.

3. A production process according to claim 1, wherein in the step (2), the heat treatment is performed until the crystallinity of the polytetrafluoroethylene reaches at least 80%.

4. A production process according to claim 1, further comprising the step of conducting heat setting by holding the heat-treated article stretched at a temperature of 150–250° C. for 1–30 minutes and under tension.

* * * * *